(12) United States Patent
Mo et al.

(10) Patent No.: US 8,134,741 B2
(45) Date of Patent: Mar. 13, 2012

(54) SYSTEM AND METHOD FOR CONTROLLING CONSISTENT COLOR QUALITY

(75) Inventors: Song-Feng Mo, Webster, NY (US); Patricia J. Donaldson, Pittsford, NY (US); Michael J. Martin, Hamlin, NY (US)

(73) Assignee: Xerox Corporation, Norwalk, CT (US)

( * ) Notice: Subject to any disclaimer, the term of this patent is extended or adjusted under 35 U.S.C. 154(b) by 1385 days.

(21) Appl. No.: 11/692,571

(22) Filed: Mar. 28, 2007

(65) Prior Publication Data

US 2008/0239341 A1    Oct. 2, 2008

(51) Int. Cl.
- G06F 15/00 (2006.01)
- G06K 1/00 (2006.01)
- G06K 15/00 (2006.01)
- H04N 1/00 (2006.01)
- H04N 1/46 (2006.01)
- H04N 1/40 (2006.01)
- G03G 15/01 (2006.01)
- G03G 15/00 (2006.01)
- G03G 15/10 (2006.01)

(52) U.S. Cl. ....... 358/1.9; 358/3.21; 358/3.06; 358/504; 358/514; 358/465; 399/40; 399/41; 399/49; 399/60; 399/61

(58) Field of Classification Search ............... 399/40, 399/41, 60
See application file for complete search history.

(56) References Cited

U.S. PATENT DOCUMENTS

| | | | | |
|---|---|---|---|---|
| 4,829,336 A * | 5/1989 | Champion et al. | | 399/60 |
| 4,866,481 A * | 9/1989 | Yamada et al. | | 399/41 |
| 4,990,955 A * | 2/1991 | May et al. | | 399/40 |
| 4,998,139 A * | 3/1991 | May et al. | | 399/40 |
| 5,066,979 A * | 11/1991 | Goto et al. | | 399/40 |
| 5,075,726 A * | 12/1991 | Itaya et al. | | 399/41 |
| 5,134,444 A * | 7/1992 | Tabuchi et al. | | 399/40 |
| 5,138,378 A * | 8/1992 | MacDonald et al. | | 399/40 |
| 5,187,535 A * | 2/1993 | Tajima | | 399/231 |
| 5,740,334 A * | 4/1998 | Lin et al. | | 358/1.9 |
| 5,745,818 A * | 4/1998 | Kumasaka et al. | | 399/40 |
| 5,848,335 A * | 12/1998 | Folkins et al. | | 399/186 |
| 5,926,674 A * | 7/1999 | Tabb et al. | | 399/231 |
| 5,983,045 A * | 11/1999 | Suzuki et al. | | 399/51 |
| 6,442,355 B2 * | 8/2002 | Hasegawa et al. | | 399/58 |
| 6,671,071 B1 * | 12/2003 | Kletter | | 358/1.9 |
| 6,959,156 B2 * | 10/2005 | Ogata | | 399/27 |
| 6,968,148 B2 * | 11/2005 | Taka et al. | | 399/301 |
| 7,206,532 B2 * | 4/2007 | Lofthus et al. | | 399/84 |
| 7,538,918 B2 * | 5/2009 | Oki | | 358/521 |
| 7,650,093 B2 * | 1/2010 | Suzuki | | 399/39 |
| 7,664,411 B2 * | 2/2010 | Komiya | | 399/38 |
| 7,684,079 B2 * | 3/2010 | Takata et al. | | 358/1.9 |
| 7,733,546 B2 * | 6/2010 | Yamada | | 358/518 |

(Continued)

*Primary Examiner* — Hilina S Kassa
(74) *Attorney, Agent, or Firm* — Oliff & Berridge, PLC

(57) ABSTRACT

A system and method control a consistent color quality of overlay colors and single separations of color. The method determines a first error for a first separation of a first color, wherein the first error has a first sign. The method identifies a second error for a second separation of a second color, wherein the second color is a different color than the first color, wherein the second error is based on an actual density value for toner particles printed transferred from the second separation, wherein the second error has a second sign. The method compares the first sign of the first error and the second sign of the second error. The method converges the actual density value of the second separation to a target position when the first sign is a different sign than the second sign.

18 Claims, 8 Drawing Sheets

U.S. PATENT DOCUMENTS

| | | | |
|---|---|---|---|
| 2006/0033946 A1* | 2/2006 | Donaldson et al. | 358/1.14 |
| 2006/0034631 A1* | 2/2006 | Lofthus et al. | 399/84 |
| 2006/0126958 A1* | 6/2006 | Kang | 382/252 |
| 2006/0285165 A1* | 12/2006 | Kakutani | 358/3.06 |
| 2007/0058188 A1* | 3/2007 | Nakahara | 358/1.13 |
| 2007/0127940 A1* | 6/2007 | Zaima | 399/53 |
| 2008/0151311 A1* | 6/2008 | Sharma et al. | 358/3.28 |

* cited by examiner

SYSTEM AND METHOD FOR CONTROLLING CONSISTENT COLOR QUALITY

TECHNICAL FIELD

Described herein are systems and methods for controlling consistent color quality of overlay colors and single separations of color for a printer engine or a copier engine.

BACKGROUND

It is known that after a print job, image densities of toner particles for colors printable by color printers or copiers are analyzed and adjusted to maintain the image densities at a desired density value. A common technique for monitoring quality of images printed by the color engines of the printers or copiers creates one or more test patches of toner particles for each color to measure a density of toner within each test patch for each of color. The test patches are imaged with the toner particles of a single color to a predetermined density. The predetermined density corresponds to the desired density which ensures that the color engine is maintaining the quality of images printed by a color engine at a visually acceptable level.

These known methods control densities of toner particles for one or more colors and single separations of color in color engines for printers or copiers to stabilize the overlay colors. The methods stabilize and control the overlay colors by independently controlling each of the single separations of color by maintaining the actual density value for each separation of color within the tolerance range associated with color. However, because of system variations in different color engines, the methods have difficulty controlling the four single separations of color to minimize an overall variation in the overlay colors. The methods independently control each of the single separations within a tolerance range to ensure that the color variation or a relative error for each single separation of color is maintained or is stabilized within a tolerance range.

However, large errors in the overlay colors occur when the actual density value of one or more of the single separations is offset upwardly with respect to the target value or has a positive value and one or more of the single separations is offset downwardly with respect to the target value or has a negative value. By having single separations of color within the tolerance ranges above the target value and below the target value, significant errors in the overlay colors are generated that are noticeable and visible to the eye of a user. Even though the actual density value for each of the single separations is located within the tolerance range, errors in the overlay colors may still be generated or created by the traditional methods for controlling the color separations or the densities of toner particles of more than one color. The errors in the overlay colors that are generated by the methods may thus be unacceptable even though the actual density value for each single separation is well within the tolerance range of the predetermined target value for each color.

A need, therefore, exists for a system and a method for controlling consistent color quality of overlay colors and single separations of color for a color engine of a printer or a copier. Moreover, a need exists for a system and a method for controlling consistent color quality which may minimize variation in overlay colors and maintain an actual density value for each single separation of color within a tolerance range of each color's target.

SUMMARY

According to aspects illustrated herein, there is provided a system for controlling consistent color quality of overlay colors. The system has a first developer unit with first toner particles of a first color, wherein the first developer unit transfers the first toner particles at a first density wherein a first actual density value of the first developer is indicative of the first density and defines a first error. Further, the system has a second developer unit with toner particles of a second color, wherein the second color is a different color than the first color, wherein the second developer unit transfers the second toner particles at a second density wherein a second actual density value of the second developer is indicative of the second density and defines a second error. Moreover, the system has a coordinator, wherein the coordinator compares a first direction with respect to a target of the first error is a different direction than a second direction with respect to a target of the second error, wherein the coordinator adjusts the density for the first developer unit, the second developer unit or both when the first direction of the first error and the second direction of the second error are different directions.

In embodiments, provided is a method for controlling consistent color quality of overlay colors and single separations of color. The method includes determining a first error for a first separation of a first color, wherein the first error has a first sign of positive or negative with respect to a target, wherein the first error is based on an actual density value for toner particles of the first color that are transferred by the first separation. Further, the method includes identifying a second error for a second separation of a second color, wherein the second color is a different color than the first color, wherein the second error is based on an actual density value for toner particles of the second color that are transferred by the second separation, wherein the second error has a second sign of positive or negative with respect to a target. Still further, the method includes comparing the first sign of the first error and the second sign of the second error. Moreover, the method includes converging the actual density value of one of the first separation or the second separation to a target position when the first sign is a different sign than the second sign, so that following convergence, the first sign and the second sign are the same.

In other embodiments, a method is provided for controlling consistent color quality of overlay colors and single separations of color. The method includes determining errors for each separation of color to make up a full color image including determining a direction of each error with respect to a target for that color, wherein the errors are representative of density for that color. Further, the method includes comparing the direction of each error, wherein the evaluation determines whether the directions of the errors for two or more colors are different. Moreover, the method includes adjusting one or more of the errors by changing density of the color associated with the error so that all of the errors have a same direction.

It is, therefore, an advantage of the various embodiments described herein to provide a system and a method for controlling consistent color quality by coordinating and by dependently controlling single separations of color to have actual density values within tolerance ranges. Another advantage of the various embodiments is to provide a system and a method for controlling consistent color quality which may adjust a relative error or a color variation for each single separation to be offset in a same direction or on a same side with respect to a target value of a tolerance range for each single separation. Yet another advantage of the various embodiments is to provide a system and a method for controlling consistent color quality which may drive the single separations to target positions for producing a minimal variation in the overlay colors. Moreover, another advantage of the various embodiments is to provide a system and a method for controlling consistent color quality which may utilize an algorithm to produce overlay color quality that is predictable and consistent.

EMBODIMENTS

Figure 1:
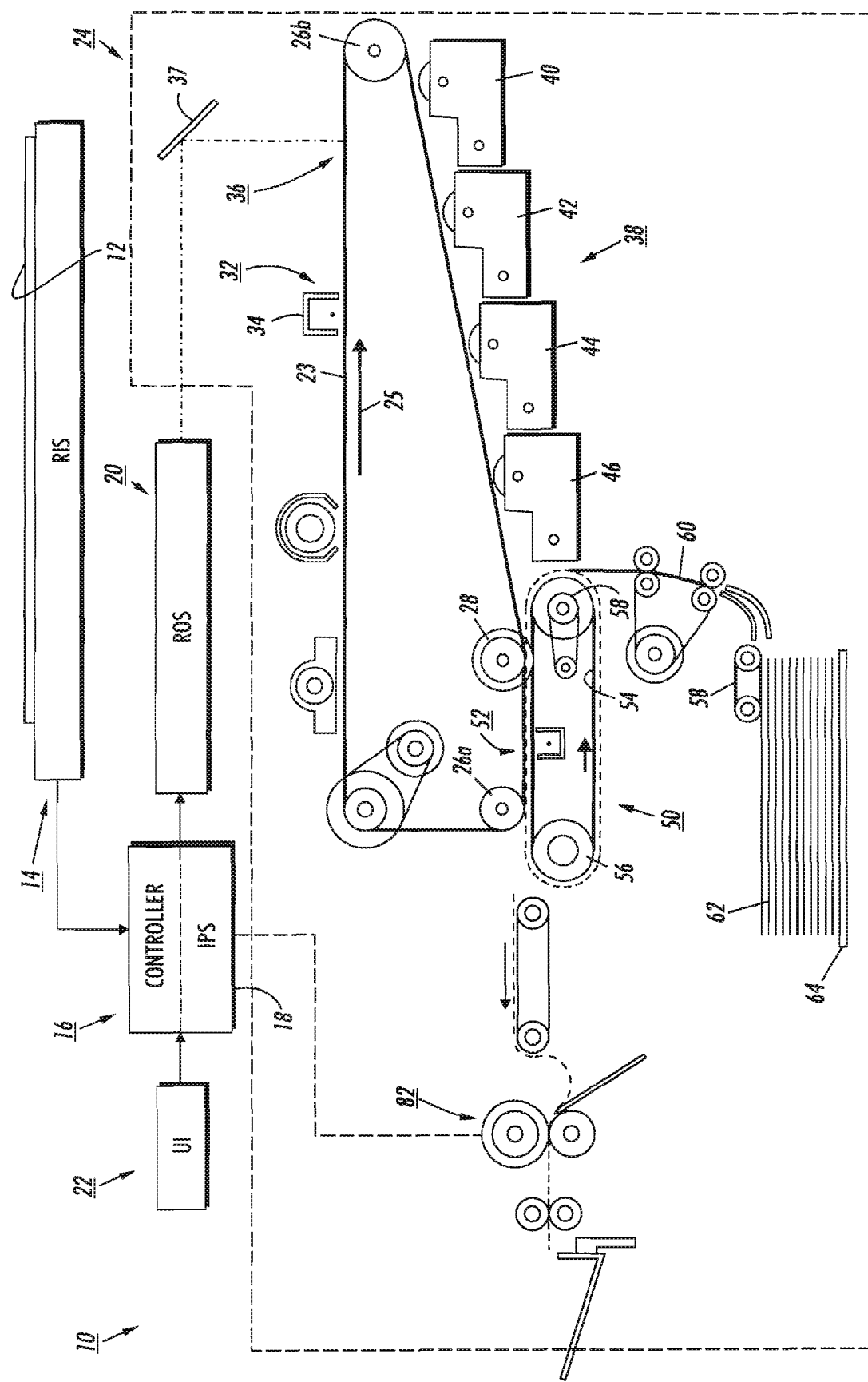
FIG. 1 illustrates a black box diagram of a system for controlling consistent color quality in an embodiment of the present disclosure.

Described herein is a system and a method for controlling consistent color quality of overlay colors and image densities for single separations of color. The overlay colors refer to portions of an image which are formed by imaging toner particles of one or more colors onto one or more portions of a photoreceptor belt or a piece of media. The toner particles from more than one of the single separations of color may be imaged onto a piece of media to form the overlay colors.

Each single separation of color refers to an image or to a print with one or more test patches from a developer station of that color. The test patches are analyzed to determine an actual density value of the toner which images or prints images onto a piece of media, such as a piece of paper during print jobs. The actual density value for each separation of color is indicative of or corresponds to the image density of toner which is transferred from the developer station to the piece of media during print jobs.

To analyze the density of toner particles for a color, such as, for example, cyan, magenta, yellow or black, more than one test patch for the color containing toner particles of that color may be created. Each test patch has a different predetermined density value which may be dependent upon the color being analyzed. Traditionally, test patches may be printed in an inter-document zone (hereinafter "IDZ") on a photoreceptor belt of a printer or a copier during an evaluation to analyze the density of the toner particles for a single color. Test patches may also be printed on an image area of the photoreceptor belt and transferred to paper. The test patches are used to measure the toner density within the test patches to determine whether the developer unit is transferring a sufficient amount of toner to sheets of paper during print jobs to maintain the quality of the images.

Toner particles of a single color, such as, for example, cyan are transferred from a cyan developer unit onto test patches for the color cyan during the evaluation for measuring and for controlling a toner reproduction curve for the color cyan. This process of creating and evaluating test patches that contain toner particles of a single color may be referred to as evaluating a single separation of color for measuring the tone reproduction curve of that single color.

The color engine may be required to print overlay colors containing toner particles of more than one color. The color engine colors may include, for example, a base color with black toner particles and overlay colors with cyan toner particles, magenta toner particles, and yellow toner particles. To control a quality of the overlay colors, the color engine must maintain actual density levels within the test patches for toner particles of each color for forming the overlay colors within a tolerance range from the desired density value or the predetermined density value. The printer or the copier maintains and controls the quality of the overlay colors by evaluating and analyzing the test patches for each single separation of color to determine whether the actual density levels for each single separation is within the tolerance range of each color. If actual density levels for a single separation of color exceed the tolerance range for that color, the printer or copier adjusts the image density of toner being transferred from the developer unit by techniques known in the art.

For example, a first patch for the color cyan may have a first predetermined density value of 100% (also known as a "solid density value") which means that 100% of the area within the first patch contains cyan toner particles. A second patch for the color cyan may have a second predetermined density value in a range from about 50% to about 60% (also known as a "mid tone density value") which means that about 50% to about 60% of the area of the second patch contains cyan toner particles. A third patch for the color cyan may have a third predetermined density value in a range from about 15% to about 20% (also known as a "high light density value") which means that about 15% to about 20% of the area of the third patch contains cyan toner particles.

Each predetermined density value for each color has a tolerance range. Each tolerance range is defined between an upper range value and a lower range value and has an target value which may be located exactly at a midpoint value between the upper range value and the lower range value. For example, the second predetermined density value of the second patch for the color cyan may have a target value of about 55%, an upper range value of about 60%, a lower range value of about 50% and a tolerance range of about +/−5%.

The printer or the copier may have a reflective sensor, such as, for example, an extended toner area coverage sensor (hereinafter "ETAC sensor") that is located adjacent to the photoreceptor belt for evaluating the test patches. During the evaluation, the test patches pass under the ETAC sensor for determining the actual density value of the toner particles thereon for a single color. The ETAC sensor and a controller of the printer or the copier determines a developed mass per unit area (hereinafter "DMA") of toner particles for each test patch as the test patches move adjacent to the ETAC sensor. Alternatively, the printer or copier may have a densitometer or spectrophotometer adjacent to the paper path for evaluating test patches on paper. In embodiments, the printer or copier may have a densitometer or spectrophotometer adjacent to the Intermediate Transfer (ITB) for evaluating test patches on ITB.

The controller analyzes the reading for each test patch and determines the actual density value of toner particles for the single color in each one or more test patches from the reading for each test patch. The actual density value of the toner particles in each test patch may have a greater percentage or a lower percentage than the target value of the tolerance range for each test patch. For example, the controller may determine that the actual density value of the toner particles in the second test patch for the color cyan is 57% or 52% by analyzing the measured reading for the second test patch. The controller may determine that the actual density value of the toner particles in the second test patch is located within the tolerance range of the second test patch for the color cyan. As a result, the controller may determine the actual density value in the test patches are located near or at the desired density value or the predetermined density value and the image density of the toner particles being transferred during printing may not require adjusting to achieve acceptable overlay colors.

The controller assigns and determines a color variation or a relative error for the color which is a difference between the target value of the tolerance range and the actual density value. For example, when the actual density value is 57% or 52% for the second test patch for the color cyan, the color variation or the relative error is +2%, or −3%, respectively. The color variation or the relative error has a positive value, for example +2% and is offset in a first direction, for example an upward direction. Alternatively, the color variation or the relative error has a negative value, for example −3% and is offset in a second direction, for example a downward direction.

However, one or more of the test patches may have an actual density value of the toner particles for more than one separation of color that is greater than the upper range value or less than the lower range value. For example, the actual density value of the second test patch for the color cyan may be 63% which is 3% greater than the upper range value of 60%. The controller determines that the actual density value of the test patch is outside the tolerance range for the second test patch of a color and identifies that the density of the toner for that color must be corrected to be within the tolerance range. For example, the controller determines that the actual density value for the color cyan is 3% greater than the upper range value and the density of toner particles transferred from the cyan developer unit must be reduced by at least 3% to be within the tolerance range.

The controller utilizes adjustment actuators (hereinafter "actuators") to perform the necessary adjustments to the image density of the toner particles for the color or of the single separation of color to yield an acceptable actual density value for one or more test patches. The acceptable actual density value is located within the tolerance ranges of the one or more test patches. The actuators identify a first position of the image density of the toner particles or of the single separation of color which corresponds to, is based on or is defined by the actual density value of a test patch. The actuator adjusts the image density to achieve acceptable actual density value.

The method may control and stabilize the image density for each single separation of color to have an actual density value within a tolerance range for each color. The method may minimize a variation of the overlay colors to produce consistent color quality for the overlay colors. The system has a coordinator for adjusting a relative error or a color variation for each single separation of color to be offset to the same side with respect to an target value of the tolerance range, to have a positive value or to have a negative value. One or more algorithms may determine a target point for each single separation that is located within the tolerance range for each single separation.

The coordinator may drive or may adjust each single separation of color to the target point if the single separation has latitude to be adjusted and the target point is located within the tolerance range for the single separation. As a result, the actual density value for each single separation may be adjusted to a target position to produce relative errors in the same direction or to have offsets to the same side with respect to the target values of the tolerance range for each single separation of color. Thus, a variation of the overlay colors may be minimized because the relative errors or the color variation for each single separation of color may be in the same direction or may be offset to the same side with respect to the target value of the tolerance ranges for the single separations of color.

Referring now to the drawing wherein like numerals refer to like parts, FIG. 1 illustrates as a system 10 for controlling consistent color quality of overlay colors and single separations of color. A multi-color original document 12 (hereinafter "document 12") may be positioned on a raster input scanner 14 (hereinafter "RIS 14") having a document illumination lamps, optics, a mechanical scanning drive, and a charge coupled device. The RIS 14 may capture and may convert the document 12 into a series of raster scan lines to measure a set of primary color densities, such as a red density, a green density and a blue density at points of the document 12.

The series of raster scan lines or the set of primary color densities may be transmitted to a controller 16 having an image processing system 18 (hereinafter "IPS 18"). The IPS 18 may contain control electronics for preparing and for managing image data flow to a raster output scanner 20 (hereinafter "ROS 20"). A graphic user interface 22 (hereinafter "UI 22") may be in communication with the PS 12. The UI 22 may enable a user (not shown in the figures) to control adjustable functions of the system 10. An output signal from the UI 22 may be transmitted to or may be received by the IPS 12. The output signal may correspond to an image of the document 12 that is transmitted from the IPS 18 to the ROS 20. As a result, the ROS 20 may create or may produce an output copy image of or a copy of the document 12. The ROS 20 may produce the output copy image in a series of horizontal scan lines with each line having a specified number of pixels per inch.

The ROS 20 may include a laser having a rotating polygon mirror blocks associated therewith. The ROS 20 may expose a charged photoconductive belt 23 of a marking engine 24 to achieve or to produce a set of subtractive primary latent images (hereinafter "latent images"). The latent images may be developed into full color images with cyan, magenta, yellow and/or black developer material. The developed images may be transferred to a copy sheet in superimposed registration to form a multiple colored image (hereinafter "multi-colored image") on the copy sheet. The multi-colored image on the copy sheet may be fused to the copy sheet to form a color copy therein.

The marking engine 24 may be, for example, a printer, a copier or a multifunction machine, such as a xerographic marking device, a xerographic color printer, an electro-photographic printing machine, an imaging device, a marking device, a digital photocopier and the like. The photoconductive belt 23 of the marking engine 24 may be made from, for example, a polychromatic photoconductive material. The photoconductive belt 23 may move in a first direction 25 to advance successive portions of a surface of the photoconductive belt 23 sequentially through processing stations disposed along a path of movement for the photoconductive belt 23. Photoconductive belt 23 may contact or may transverse transfer rollers 26a, 26b, a tensioning roller 28, and a drive roller 30.

The drive roller 30 may be rotated by a motor 32 that may be coupled to a belt drive (not shown in the figures). The drive roller 30 may rotate to advance and to drive the photoconductive belt 23 in the first direction 25. A portion of the photoconductive belt 23 may pass through or move adjacently with respect to a charging station 32 that has a corona generating device 34 to charge the photoconductive belt 23 to an electrostatic potential. As a result, the portion of the photoconductive belt 23 may have a charged photoconductive surface. In an embodiment, the electrostatic potential of the charged photoconductive surface may be, for example, relatively high or substantially uniform.

The charged photoconductive surface may move through or may pass nearby an exposure station 35. The exposure station 35 may receive a modulated light beam corresponding to the series of raster scan lines that are derived by the RIS 14 with the document 12 positioned thereon. As described above, the RIS 14 may capture an entire image of the document 12 to convert the entire image of the document 12 into the series of raster scan lines to be transmitted as the electrical signals to the IPS 18. The electrical signals from the RIS 14 may correspond to the red density, the green density and the blue density at points in the document 12. As a result, the IPS 18 may produce or may generate a set of the red density signal, the green density signal and of the blue density signal (hereinafter "set of red, green and blue density signals").

The set of red, green and blue density signals may correspond to or may represent a set of signals corresponding to the primary color densities of the document 12. The IPS 18 may convert the set of red, green and blue density signals into a set of calorimetric coordinates. Keys of UI 22 may be actuated to adjust parameters of the system 10. The UI 22 may include, for example, a touch screen and the like to provide the user with an interface for the system 10. Output signals from the UI 22 may be transmitted to the IPS 18, which may transmit the output signals corresponding to the image of the document 12 to the ROS 20. As described above, the ROS 20 may have a laser with the rotating polygon mirror blocks 36 (hereinafter "the mirror 36"). In an embodiment, the mirror 36 may be, for example, a nine facet polygon mirror.

The mirror 36 of the ROS 20 may illuminate the charged portion of photoconductive belt 23 at a rate of about 400 pixels per inch. The ROS 20 may expose the photoconductive belt 23 to record, for example, latent images. A first latent image may be developed with a cyan developer material. A second latent image may be developed with a magenta developer material. A third latent image may be developed with a yellow developer material. The latent images formed by the ROS 20 on the photoconductive belt 23 may correspond to the output signals transmitted from The IPS 18. In embodiments, a fourth latent image may be recorded and may be developed with black toner particles.

After the electrostatic latent images are recorded on the photoconductive belt 23, the photoconductive belt 23 advances the latent images to a development station 38. In embodiments, the development station 38 may have four individual developer units 40, 42, 44, 46 for a different color, such as, for example, magenta, yellow, cyan or black. In embodiments, the development units 40, 42, 44, 46 may be, for example, magnetic brush development units that employ a magnetizable developer material having magnetic carrier granules therein. The magnetic carrier granules may be semicircular or may have toner particles adhering triboelectrically thereto. The magnetizable developer material may be brought through a directional flux field to form a brush of the magnetizable developer material. In embodiments, the magnetizable developer material may be constantly moving to provide the brush with fresh developer material.

The brush of magnetizable developer material may contact the photoconductive surface to develop the image of the document 12. The developer units 40, 42, 44 may apply the toner particles of a specific color corresponding to the color separated electrostatic latent image recorded on the surface of the photoconductive belt 23. The color of each of the toner particles may be formed to absorb light within a pre-selected spectral region of the electromagnetic wave spectrum. For example, an electrostatic latent image formed by discharging the portions of charge on the photoconductive belt corresponding to the green regions of the document 12 may record a red portion and a blue portion as areas of relatively high charge density on photoconductive belt 23. Additionally, the green areas may be reduced to a voltage level ineffective for development.

The developer unit 46 produces images on a piece of media by separating colors within the document 12 such that each color from the document 12 may be generated by toner particles from the single separations of color within the developer unit 46 via the developer units 40, 42, 44, 46. A first separation of color, for example a green separation, may be made visible by having developer unit 40 apply green absorbing (magenta) toner particles onto the electrostatic latent image recorded on photoconductive belt 23. A second separation of color, for example a blue separation, may be developed by developer unit 42 with blue absorbing (yellow) toner particles. A third separation of color, for example a red separation, may be developed by developer unit 44 with red absorbing (cyan) toner particles.

The developer unit 46 may contain black toner particles for developing an electrostatic latent image formed by a fourth separation of color black. In embodiments, the black toner particles may provide undercolor removal in a color image. In embodiments, the black toner particles may be a base color for the overlay colors. Each of the developer units, 40, 42, 44, 46 may be moved into or out of an operative position for positioning the magnetic brush adjacent to the photoconductive belt 23. In the non-operative position, the magnetic brush of each of the developer units, 40, 42, 44, 46 may be spaced there from or may be remotely located with respect to the photoconductive belt 23.

The developer unit 46 may be positioned in the operative position with respect to the developer units 40, 42 and 44 that are located in the non-operative position, for example as illustrated in FIG. 1. For example, during development of each electrostatic latent image, the developer unit 46 may be in the operative position and remaining developer units 40, 42, 44 may be in the non-operative position. As a result, each electrostatic latent image may be developed with toner particles of the appropriate color.

The toner image may be moved to a transfer station 48 having a transfer zone 50. In transfer zone 50, the toner image may be transferred to a sheet of media 60. At transfer station 48, a sheet transport apparatus 52 may move the sheet of media 60 into contact with photoconductive belt 23. The sheet transport apparatus 52 may be a pair of spaced belts 54 entrained about or connected to a pair of substantially cylindrical rollers 56, 58. A sheet gripper 70 may extend between the pair of spaced belts 54 or may move in unison with the pair of the spaced belts 54. The sheet of media 60 may be advanced from a stack of sheets 62 disposed on a tray 64. Each sheet of media 60 within the stack 62 may be made of a material, such as paper, cellulose pulp, plastic or any other suitable substrate for receiving the images formed from the toner particles as known in the art. In embodiments, each sheet of media 60 may be made of paper for receiving the toner particles or the developer material.

The different color toner images may be transferred to the sheet of media 60 in superimposed registration with one another. Each of the electrostatic latent images recorded on the surface of the photoconductive belt may be developed with the appropriately colored toner particles and transferred, in superimposed registration with one another, to the sheet of media forming the multi-color copy of the document 12. The toner image on the sheet of media 60 may contact the fuser roll 82 to be affixed or to be fused to the sheet of media 60.

Figure 2:
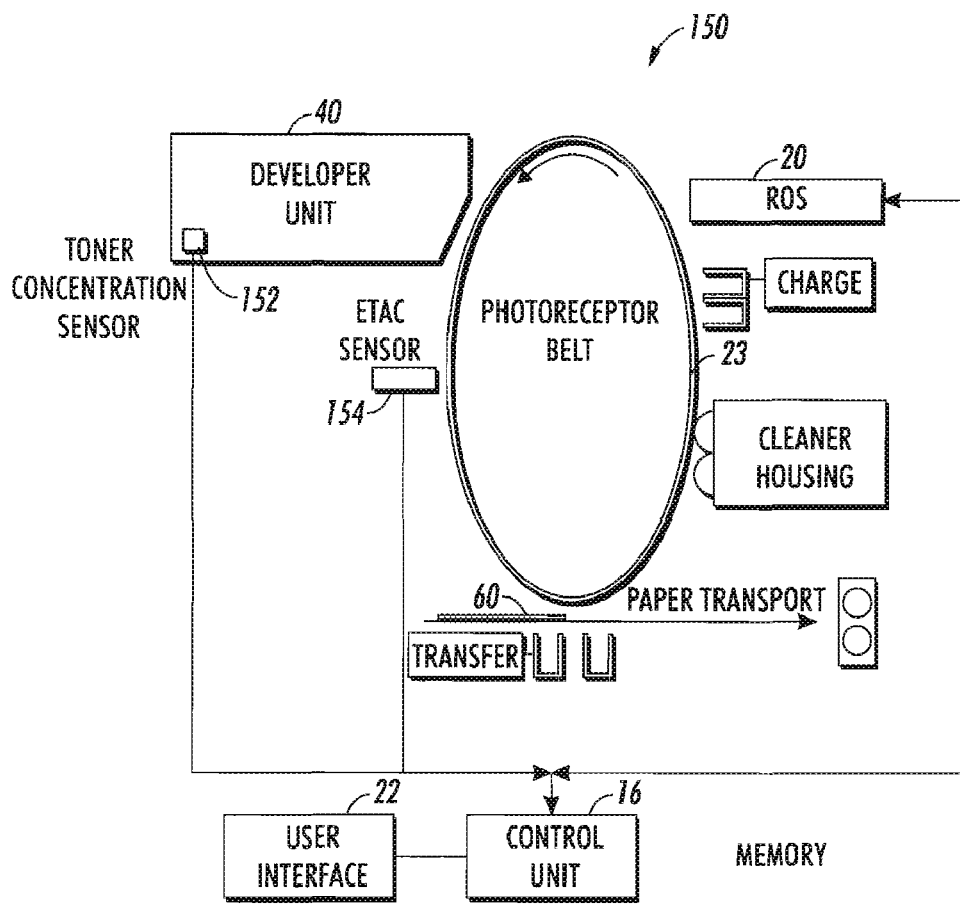
FIG. 2 illustrates a black box diagram of a system for evaluating test patches via a sensor to control consistent color quality in an embodiment of the present disclosure.

FIG. 2 shows a block diagram of a system 150 in accordance with the present disclosure. The system 10 may include the UI 22 and the controller 16 that drives the ROS 20. The photoreceptor belt 23 may rotate in the first direction 25 as shown in FIG. 2 for the development of the latent image and the transfer of toner particles outwardly with respect to the developer unit 40 from the latent image to the sheet of media 60.

The system 150 may have a toner concentration sensor 152 and a ETAC sensor 154. Signals from the toner concentration sensor 152 and the ETAC sensor 154 may be utilized by the controller 16 to determine the DMA for images being developed on test patches for single separators of color via the system 150. The system 150 may have developer units 42, 44, 46 incorporated therein. The ETAC sensor 154 may be a reflective sensor having a light emitting diode (hereinafter "LED") and photodetectors. In the ETAC sensor 154, the LED may be, for example a 940 nm infrared LED emitter and the photodetectors may be commercially available PIN or PN photodiodes. The signals from photodetector are used in a known manner by the controller 16 to determine a density for a toner patch on the photoreceptor belt 23.

Xerographic test patches are traditionally printed in the IDZ on the photoreceptor during an evaluation. While not permanent, their measurements are used for description purposes. The method is conceived to be implemented on a product in which test patches are evaluated for each separation of color by the solid density value, the mid tone density value, and highlight density value, and are each around 11 mm in length, which provides a timing factor of safety ±4 mm. The ETAC sensor 154 may obtain information as close to the middle of each test patch as possible, for example, about 5.5 mm. With a standard ETAC field of view of around 3 mm, this may allow a 4 mm cushion on either end of the test patch.

Figure 3:
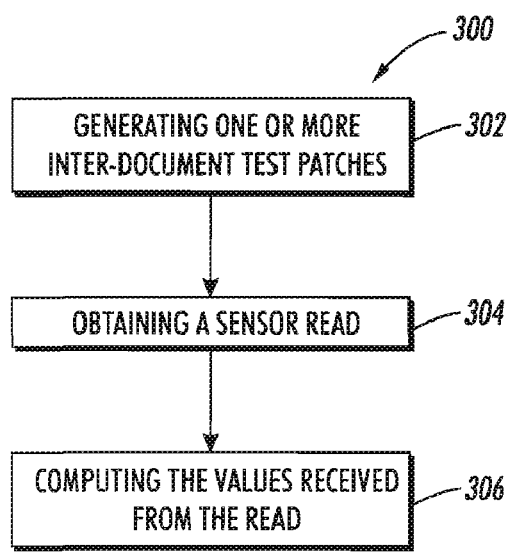
FIG. 3 illustrates a flow chart of a method for monitoring test patches for single separations of color in an embodiment of the present disclosure.

A flow chart of a method 300 for monitoring inter-document patches is shown in FIG. 3. The method 300 may generate one or more inter-document test patches as shown in step 302. There are several types of test patches and therefore several different sequences that test patches may be aligned in. The solid density value may indicate that 100% of the area within the patch contains toner particles of a color. The mid tone density value may indicate that about 50% to about 60% of the area of the patch contains toner particles of a color. The highlight density value may indicate that about 15% to about 20% of the area of the patch contains toner particles of a color. A typical sequence of test patches is: a first patch for the solid density value; a second patch for a mid tone density value; and a third patch for the highlight density value.

Because there is knowledge as to the dimensions and layout of each patch, the controller 16 may obtain a sensor read for each patch via the ETAC sensor 154 and the toner concentration sensor 152 as shown in step 304. In embodiments, the timing and accuracy of the ETAC sensor 154 may be adjusted after every print job to produce a margin of error so negligible, that the ETAC sensor 154 will be able to be directly over patches from about 0.1 mm to equal to or less than the field of view of the ETAC sensor 154 without missing the patch and losing the quality of a read.

As mentioned above, a common technique for monitoring the quality of prints is to create a test patch of or test patches of toner of a predetermined desired density. For example, the test patches for each separation of color may be generated through an image path that may utilize the ROS 20 to generate a latent image of the test patches on the photoreceptor belt 23. The test patches may be imaged onto the IDZ of the photoreceptor belt 23 and not in an image area of the photoreceptor 23.

In embodiments, after every print job, the image density of the toner particles may be analyzed by the controller 16 by evaluating the test patches to determine density for each test patch via the ETAC sensor 154. The controller 16 may determine, via the density, whether the relative error for one or more separations of color is beyond the tolerance range for the colors and may adjusted the density of those colors via actuators. In embodiments, the predetermined values, that are the desired densities, for each color or single separation of color may be, for example, test patches for the color cyan that have a solid density value of about 100% with a tolerance range of −10%, a mid tone density value of about 55% with a tolerance range of +/−5%, and a highlight density value of about 17.5% with a tolerance range of +/−2.5%.

The controller 16 may evaluate the density for one or more test patches for a single separation and may calculate the actual density values for the one or more test patches as shown in step 308. For example, the controller 16 may determine that the test patches for a single separation of color for the color cyan may have the following actual density values: solid density value of 100%; mid tone density value of 57%; and a highlight density value of 12%. The actual density value measured within the patch for the highlight density value is less than the tolerance range of −2.5% and outside of the lower range value of 15% for the color cyan. Therefore, the relative error of the highlight density value for the color cyan is −5.5% and the relative error of the mid tone density value is +2%. Thus, the actuators may be used to perform the needed adjustments to the image density of the single separation for the color cyan. The actuators may adjust the image density to a target position to achieve an actual density value of the highlight density value within the tolerance range.

Figure 4:
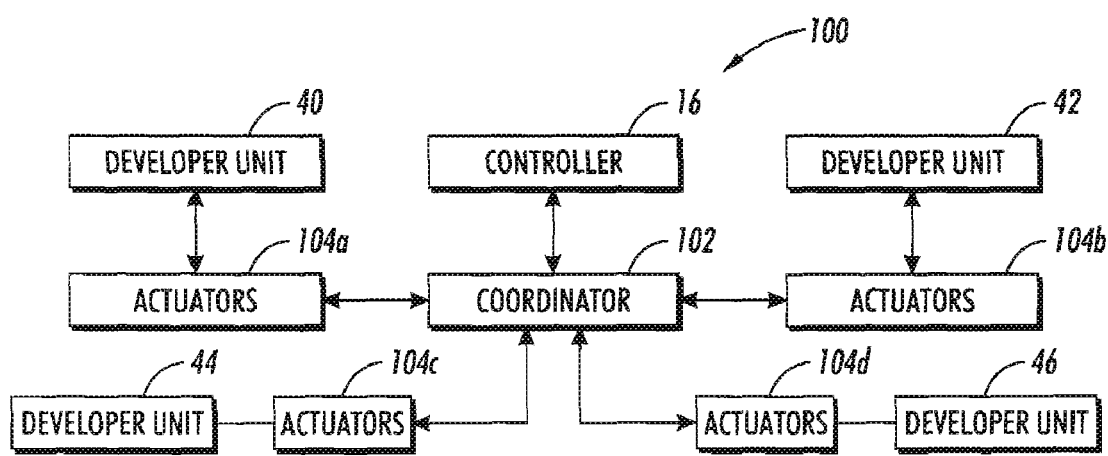
FIG. 4 illustrates a black box diagram of a system for controlling consistent color quality in an embodiment of the present disclosure.

FIG. 4 illustrates a system 100 for controlling consistent color quality of the overlay colors and the single separations of color. The system 100 may have a coordinator 102 which may be operatively connected to the controller 16. The developer units 40, 42, 44, 46 may be operatively connected to the coordinator 102. The coordinator 102 may control and may coordinate the relative errors for the first separation of color, the second separation of color, the third separation of color and the fourth separation of color by controlling image density produced or created by the developer units 40, 42, 44, 46, respectively.

As set forth above, the relative error of a test patch is based on an actual density value in a test patch for a single separation of color with respect to the target value of a tolerance range. The tolerance range for each single separation of color has an upper range value, a lower range value and a target value that may be located at a midpoint between the upper range value and the lower range value. The actual density value for each single separation of color may be located above or below the target value of the tolerance range for each single separation of color. The relative error is the difference between the actual density value and the target value for each test patch of each single separation of color. The relative error has a positive value if the actual density value is located above the target value of the tolerance range. Alternatively, the relative error has a negative value if the actual density value is located below the target value of the tolerance range.

The coordinator 102 may adjust the image density for each single separation such that the relative errors for the single separations have a positive value, a negative value or is offset to the same side with respect to the target value. The coordinator 102 may control the overlay colors in the copy of the image of the document 12 by adjusting the image density or the relative errors of the single separations to have positive values or negative values. The overlay colors are formed from toner particles of one or more of the single separations of colors or the developer units 40, 42, 44, 46.

The images of the document 12 may have overlay colors, such as, for example balanced gray colors or may have an increased balance in the gray colors because the coordinator 102 may drive the relative errors of single separations to be in the same direction. In embodiments, the coordinator 102 may converge the offsets of the single separations to the same side. Moreover, the coordinator 102 may drive the relative error for each single separation of color to a target position to control overlay colors while maintaining a maximum variation for each of the four single separations within a tolerance range.

The system 10 and/or the system 100 (collectively known hereinafter as "systems 10, 100") may have the coordinator 102 therein to determine or to calculate the target position for achieving better control of and consistency in the overlay colors. Moreover, the systems 10, 100 may achieve better control of the overlay colors and may maintain the relative error in test patches of each single separation within the tolerance ranges for the test patches of the colors. The coordinator 102 may utilize an algorithm to determine or to calculate the target position for the single separations. The coordinator 102 may adjust image density via actuators 104a-104c to drive the actual density position for each of the developer units 40, 42, 44, 46 to the target positions with positive values, negative values or offset in the same direction with respect to the target values. In embodiments, the actuators may be, such as, for example the ROS 20, a Vmag(Vbias), Vmc (or Vclean), and TC to adjust image density to a target position. In embodiments, the term "Vmag" may refer to voltage on the developer roll. Further, the term "Vmc" may refer to voltage difference between the development roll and the charged area of the photoreceptor. Moreover, the term "TC" may refer to toner concentration in the developer housing.

In embodiments, the first separation of color, the second separation of color, the third separation of color and the fourth separation in black (hereinafter "required single separations of color") are required to maintain or to produce a color balance for overlay colors or the neutral colors within the copy of the image of the document 12. The toner particles from the developer units 40, 42, 44 may be transferred to the media 60 to produce the color balance for the neutral colors or the overlay colors. A human eye may be more sensitive to errors within the neutral colors or the overlay colors in the copy of the image of the document 12 than minimal errors located within other portions of color space in the copy of the image of the document 12. As a result, smaller errors within the neutral colors or the overlay colors, compared to larger errors within other portions of color space, may be unacceptable and undesirable by the user of the systems 10, 100.

In embodiments, the controller 16 of the systems 10, 100 may have a digital data storage system (not shown in the figures) for storing and for accessing tolerance error data for each of the required single separations of color. The tolerance error data for each of the required single separations of color may be predetermined and stored within the digital data storage system of the controller 16. Alternatively, the tolerance error data for each of the required single separations of color may be inputted into the control 16 via the UI 22 or stored within the digital data storage system. The tolerance error data may be associated with test patches for each single separation or test patches having the solid density value, the mid tone density value and the highlight density value.

The tolerance error data may contain or may identify a control error tolerance (hereinafter "RR, or relative reflectance, tolerance") for each of the required single separations of color. The RR tolerance for each of the required single separations of color may be within, for example, a range of about +0.02 and about −0.02 and more preferably within a range of about +0.015 and about −0.015. RR is a ratio of the amount of light reflected from a toned photoreceptor relative to the amount reflected from a bare photoreceptor, and may be between 0 and 1.

In embodiments, the tolerance range of a test patch for each required single separation may be equivalent to or may be similar to a color digital bit input error in a DAC space within a range of 0 to 255. DAC refers to Digital Area Coverage, which may be an 8-bit (byte) representation of the density. Byte values may extend from 0 to 255. In embodiments, the DAC may be 10 or more bits to provide greater accuracy. Further, the color digital bit input error for each required single separation may be within, for example, a range of about +8 bits and about −8 bits in the DAC space and more preferably within a range of about +5 bits and about −5 bits in the DAC space.

The maximum variation for each of the required single separations of color may be within or may be less than the RR tolerance or the color digital bit input error for each required single separation. The controller 16 may monitor the actual density value for each required single separations of color to prevent exceeding the maximum variations for the required single separations. The developer units 40, 42, 44 for the required single separations of color may have the actuators 104a-104c, respectively, for adjusting image density for each required single separation to change the relative error within one or more patches of each single separation. In the actual position, each of the required single separations of color may transfer toner particles to the sheet of media 60 to form the overlay colors or the neutral colors.

The actual density value for each single separation of color may be indicative of the DMA in each test patch for each required single separation. The actual density value may be within the maximum variations for each single separation of color. The controller 16 may monitor the actual density value of each patch, may determine a relative error associated with each test patch and may adjust the image density for each single separation via the one or more actuators 104a-104c. As a result, the controller 16 may maintain each required single separation of color within the RR tolerance or the color digital bit input.

The coordinator 102 may determine whether one or more of the actuators 104a-104c for the required single separation of color have latitude to adjust the image density for the required single separations of color to achieve a target position without exceeding the maximum variations, the RR tolerances and the color digital bit inputs. Latitude refers to whether the actuators 104a-104c have the capability to adjust the image density for a color such that the single density value corresponding to the adjusted image density is within the tolerance range of the test patches for the color. If the actuators 102a of the first separation do not have latitude to adjust the image density of the first color, the coordination 102 may identify whether the actuators 102b, 102c have latitude to adjust the images densities of the second separation or the third separation. As a result, the coordinator 102 may adjust at least one of the image densities of the second separation and the third separation to achieve at least one target position for the actual density values of the second separation and the third separation.

If the actuators 104a-104c for each required single separation of color is determined to have latitude, the coordinator 102 may adjust the image density to correspond to the target position that is determined by the coordinator 102. The coordinator 102 may adjust the image density of the developer units 40, 42, 44 for the first separation of color, the second separation of color and the third separation of color, respectively, to target positions via actuators 104a-104c. The new actual density value may correspond to the target positions and may not exceed maximum variation or the RR tolerance for each required single separations of color.

If the coordinator 102 determines that relative errors for test patches are in the positive direction and the relative errors for other test patches are in the negative direction, the coordinator 102 drives the relative errors in one direction so that all of the relative errors are in the same direction, for example a positive direction or a negative direction with respect to the target value. By changing the image density of the developer units 40, 42, 44 to achieve the target positions via adjusting image densities, the relative errors may be in the same direction, may have a positive value or may have a negative value.

Figure 5:
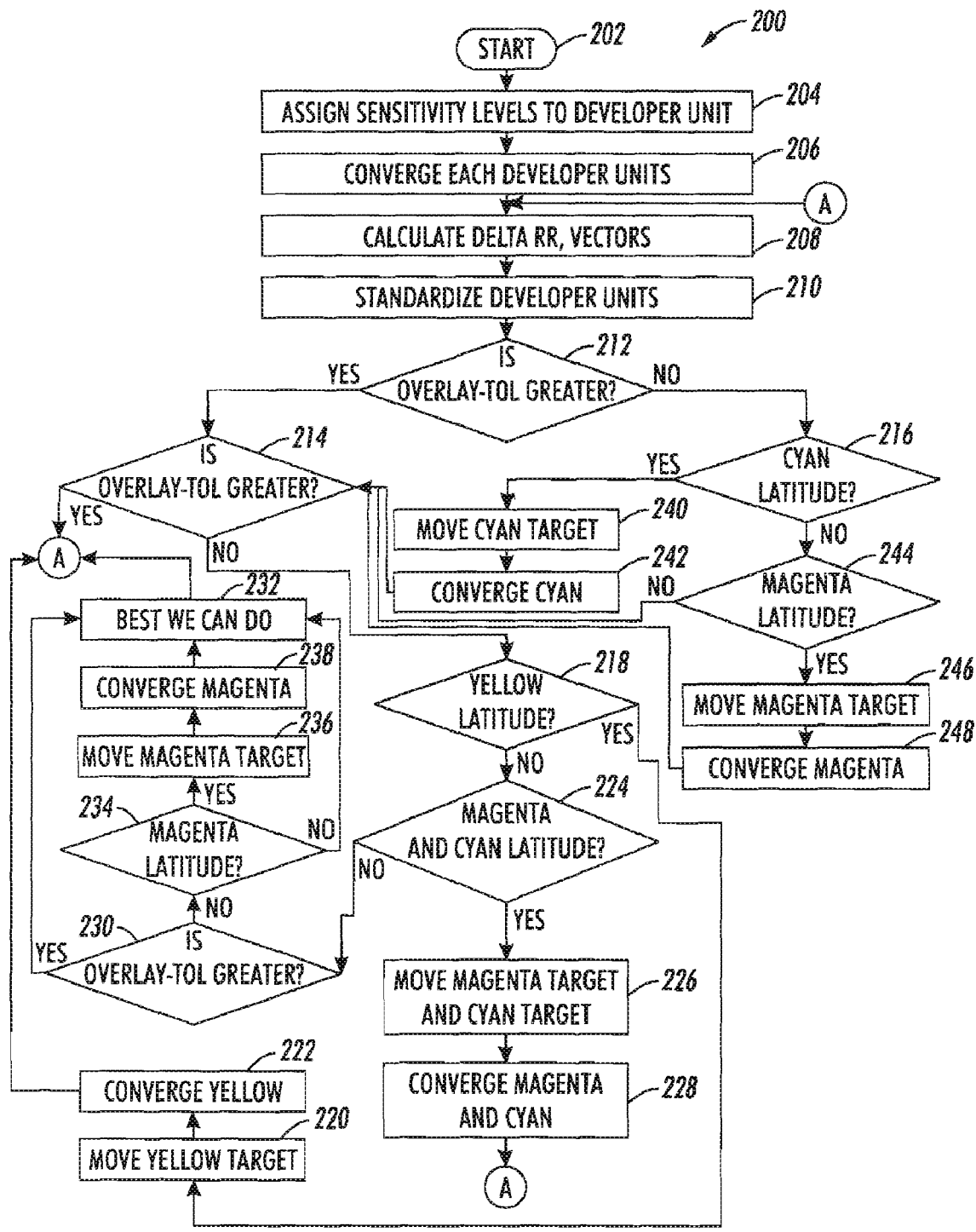
FIG. 5 illustrates a flow chart of a method for controlling consistent color quality in an embodiment of the present disclosure.

FIG. 5 illustrates a flow chart for a method 200 for controlling the consistent color quality of the overlay colors and the required single separations of colors. The method 200 may represent a computer source code or a computer program which may be incorporated into the digital data storage system of the controller 16 or programmed into the coordinator 106. In embodiments, the method 200 may include or may represent one or more algorithms for converging the required single separations of colors to control the consistent color quality of the overlay colors.

In embodiments, the user may initialize a task or a job, such as, for example, a print job. As the RIS 14 may capture and may convert the document 12 into a series of raster scan lines, the coordinator 102 may start a consistent color control, such as method 200 as shown at step 202 in FIG. 5. The coordinator 102 may determine or may identify sensitivity of the overlay colors to each of the required single separations of color for the systems 10, 100 as shown at step 204. The coordinator 102 may assign a mark to each of the required single separations of color to identify the sensitivity of each of the required single separations of color. The mark may represent or may correspond to one of low sensitivity, of medium sensitivity and of high sensitivity. For example, the first separation of color may be marked high sensitivity, the third separation of color may be marked medium sensitivity and the second separation of color may be marked low sensitivity by the coordinator 102 for systems 10, 100.

The purpose of assigning sensitivities is as follows. In embodiments, when it is not possible to have all colors on the same side of the RR target, the controller may decide which color or colors are the "most important" color or colors. For example, it may be preferable to have magenta and yellow both positive with respect to their targets, but may allow cyan to go below the target, in order to minimize overlay color errors while maintaining all separations within their respective tolerance bands. Thus, the coordinator 102 may assign marks corresponding to high sensitivity and medium sensitivity to the magenta single separation of color and the yellow single separation of color, respectively. Moreover, the coordinator 102 may assign a mark corresponding to low sensitivity to the cyan single separation of color.

The coordinator 102 may assign, may determine or may identify a target position for each required single separation as shown in step 206. The target position for each of the required single separations may be less than or within the maximum variation of the RR tolerance for the required single separations, respectively. Target positions for the required single separations of color may correspond to or may be identified by a target RR tolerance values (hereinafter "RR Target") that is less than or located within the RR tolerance for each required single separation. Target positions may be achieved by adjusting image density of the developer units 40, 42, 44.

The coordinator 102 may calculate a target value to the single separation of color assigned low sensitivity that is identified as "RR_Target_l." Further, the coordinator 102 may calculate a target value to the single separation of color assigned medium sensitivity that is identified as "RR_Target_m." Still further, the coordinator 102 may assign or may calculate a target value to the single separation of color assigned high sensitivity that is identified as "RR_Target_h." Moreover, RR_Target_l, RR_Target_m and RR_Target_h may be less than the limits the RR tolerance for the required single separations of color, respectively.

In embodiments, the target positions for the required single separations may be determined by calculating moving averages for each required single separations of color that are indicative of actual density values in test patches for the required single separations of color. Actual density values for the required single separations of color may correspond to or may be identified by Reading RR tolerance values (hereinafter "RRs Readings") that is less than limits of the RR tolerance for each required single separation of color.

The coordinator 102 may read, from the ETAC sensor, a RR reading value to the single separation of color assigned low sensitivity that is identified as "RR_l." Further, the coordinator 102 may assign or may identify a RR tolerance value to the single separation of color assigned medium sensitivity that is identified as "RR_m." Still further, the coordinator 102 may assign or may identify a target value to the single separation of color assigned high sensitivity that is identified as "RR_h." In embodiments, "RR_x" may refer to reading of a density sensor for each of the patches which may driven by the control system to close to the target, i.e. RR_Target_x through adjusting actuators, such as, for example Vmag, Vmc, and TC and the like.

The coordinator 102 may calculate vectors of the RR tolerance values (hereinafter "Delta_RRs") for the required single separations of color as shown in step 208. The Delta_RRs vectors may include or may be calculated from the RR tolerance values for single separations that are marked low sensitivity, medium sensitivity and high sensitivity. The Delta_RRs vectors may be defined by the following expression:

$$\text{Delta\_}RRs = RRs\_\text{Target} - RRs\_\text{Readings; and} \quad (1)$$

$$\text{Delta\_}RRs = [RR\_\text{Target\_}h, RR\_\text{Target\_}m, RR\_\text{Target\_}l]^T - [RR\_h\ RR\_m\ RR\_l]^T \quad (2)$$

wherein T is a transpose operation of a vector or a matrix.

The coordinator 102 may standardize errors with respect to high sensitivity, medium sensitivity and low sensitivity for each required single separation of color as shown in step 210. The errors may be standardized based on the RR error relationship to the color variation. In embodiments, for the single separation, RR error may equal 0.01 which may be about one Delta_E color variation in color space.

As shown in step 212, the coordinator 102 may determine or may calculate whether an overlay tolerance value for the overlay colors (hereinafter "Overlay_Tol") is greater than an absolute value of a difference between RR tolerance values for the first separation of color (hereinafter "Delta_RRs_M") minus a difference between RR tolerance values for the third separation of color (hereinafter "Delta_RRs_C") that is defined by the following expression:

$$\text{Abs}(\text{Delta\_RRs\_M}-\text{Delta\_RRs\_C})<\text{Overlay\_Tol} \quad (3)$$

If the expression (3) is true, the coordinator 102 may proceed to step 214 of the method 200. Alternatively, if the expression (3) is false, the coordinator 102 may proceed to step 216 of the method 200.

In step 214, the coordinator 102 may determine or may calculate whether the Overlay_Tol is greater than the absolute value of Delta_RRs_M minus a difference between RR tolerance values for the second separation of color (hereinafter "Delta_RRs_Y") that is defined by the following expression:

$$\text{Abs}(\text{Delta\_RRs\_M}-\text{Delta\_RRs\_Y})<\text{Overlay\_Tol} \quad (4)$$

If the expression (4) is true, the coordinator 102 may return back to step 208. If the expression (4) is false, the coordinator 102 may proceed to step 218 of method 200.

The coordinator 102 may determine whether the actuators 104b of the second separation of color have latitude to adjust the image density or move within the RR tolerance of the second separation of color as shown in step 218. If the coordinator 102 determines that the actuators 104b of the second single separation have latitude to move, the coordinator 102 may determine or may calculate the target position of the actual density value for the second separation as shown in step 220. In embodiments, the coordinator 102 may calculate or may determine the target position for the second separation, such as, for example, the yellow separation with the following expression:

$$\text{Yellow\_RRs\_Target}=\text{Yellow\_RRs\_Target}+\text{Delta\_RRs\_Y}-\text{Delta\_RRs\_M} \quad (5)$$

In embodiments, Delta_RRs_Y may be the delta RR per equations (1) or (2) for yellow. In embodiments, equations (1) or (2) may be applied to obtain delta RRs for other colors.

The coordinator 102 may adjust the image density for the second separation to achieve the target position for the second separation via the actuators 104b of the second separation as shown in step 222. As a result, the actual density value or the relative error of the second separation may be converged to the target position. After converging the second separation of the required single separations of color to the target position, the coordinator 102 may return to step 208 in method 200 for converging the first separation or the third separation to target positions, respectively.

Returning to step 218 of method 200, the coordinator 102 may determine that the actuators 104b of the second separation do not have latitude to move or to adjust the image density without exceeding the RR tolerance of the second separation. As a result, the coordinator may identify whether the actuators 104a, 104c have latitude to adjust the image density to achieve target positions for relative errors within the RR tolerances of the first and third separations, respectively, as shown in step 224.

The coordinator 102 may determine that the actuators 104b of the second separation of the required single separations may have latitude to adjust the image density to achieve target position within the RR tolerance thereof. As a result, the coordinator 102 may calculate a target position for the first separation and a target position for the third separation as shown in step 226. In embodiments, the coordinator 102 may calculate the target positions for the first separation and the third separation, such as, for example, the magenta separation and the cyan separation, respectively with the following expression:

$$\text{Magenta\_RRs\_Target}=\text{Magenta\_RRs\_Target}+\text{Delta\_RRs\_M}-\text{Delta\_RRs\_Y}; \text{and} \quad (6)$$

$$\text{Cyan\_RRs\_Target}=\text{Cyan\_RRs\_Target}+\text{Delta\_RRs\_C}-\text{Delta\_RRs\_Y}; \text{and} \quad (7)$$

The coordinator 102 may adjust the image densities for the first separation and the third separation of the required single separations to achieve the target positions via the actuators 104b, 104c, respectively, as shown in step 228. As a result, the first separation and the third separation may be converged to the target positions for the relative errors. After converging the first separation and the third separation to the target positions the coordinator 102 may return to step 208 in the method 200 for converging the second separation to a target position.

Returning to step 224 of the method 200, the coordinator 102 may determine that the actuators 104a, 104c of the first separation and the third separation do not have latitude to adjust the image densities without exceeding the RR tolerances of the first separation and the third separation, respectively. As a result, the coordinator 102 may determine whether Overlay_Tol is greater than the absolute value of Delta_RRs_M minus Delat_RRs_C as shown in step 230 and defined by the following expression:

$$\text{Abs}(\text{Delta\_RRs\_M}-\text{Delta\_RRs\_C})<\text{Overlay\_Tol} \quad (8)$$

If the expression (8) is true, the coordinator 102 may proceed to step 232 for indicating or for identifying that the none of the required single separations of color may be converged to target positions to reduce variation in the overlay colors. As a result, the coordinator 102 determines that the current relative errors of the required single separations of color provide the most consistent color control for the overlay colors and the single separations of color. Alternatively, if the expression (8) is false, the coordinator 102 may proceed to step 234 of the method 200.

In step 234, the coordinator 102 may determine or may identify whether the actuators 104a of the first separation have latitude to adjust the image density of the first separation to a target position for the relative error within the RR tolerance of the first separation. The coordinator 102 may determine that the actuators 104a of the first separation do not have latitude to adjust the image density to achieve the target position without exceeding the RR tolerance for the first separation. As a result, the coordinator 102 may proceed to step 232 and may identify that current relative errors of the required single separations of color provide the most consistent color control for the overlay colors and the single separations of color.

If the actuators 104a of the first separation have latitude to adjust the image density to achieve a target position, the coordinator 102 may determine or may calculate the target position of the relative error for the first separation as shown in step 236. In embodiments, the coordinator 102 may calculate the target position for the first separation, such as, for example, the magenta separation with the following expression:

$$\text{Magenta\_RRs\_Target}=\text{Magenta\_RRs\_Target}+\text{Delta\_RRs\_M}-\text{Delta\_RRs\_Y}; \text{ and} \quad (9)$$

The coordinator 102 may adjust the image density of the first separation to achieve the target position of the relative error for the first separation via the actuators 104a of the first separation as shown in step 238. As a result, the relative error of the first separation may be converged to the target position. After converging the relative error of the first separation to the target position, the coordinator 102 may proceed to step 232 in the method 200 for identifying that the current relative errors of the required single separations of color provide the most consistent color control for the overlay colors and the single separations of color.

Returning to step 212 of the method 200, the expression (3) may be false and the coordinator 102 may proceed to step 216 of the method 200. The coordinator 102 may determine or may identify whether the actuators 104c of the third separation have latitude to adjust the image density to achieve a target position for the relative error of the third separation within the RR tolerance of the third separation as shown in step 216. If the coordinator 102 determines that the actuators 104c of the third separation have latitude to adjust the image density, the coordinator 102 may calculate the target position for the third separation as shown in step 240. In embodiments, the coordinator 102 may calculate the target position for the third separation, such as, for example, the cyan separation with the following expression:

$$\text{Cyan\_RRs\_Target}=\text{Cyan\_RRs\_Target}+\text{Delta\_RRs\_C}-\text{Delta\_RRs\_M} \quad (10)$$

In embodiments, Delta_RRs_C may be obtained per equations (1) or (2) for cyan.

The coordinator 102 may adjust the image density for the third separation to achieve the target position for the relative error of the third separation via the actuators 104c of the third separation as shown in step 242. As a result, the relative error of third separation may be converged to the target position. After converging the third separation to or towards the target position for the third separation, the coordinator 102 may proceed to step 214 in the method 200 for converging the first separation or the second separation to target positions, respectively.

If the coordinator 102 determines that the actuators 104c of the third separation do not have latitude to move without exceeding the RR tolerance for the third separation, the coordinator 102 may determine or may identify whether the actuators 104a for first separation have latitude to move to a target position within the RR tolerance of the first separation as shown in step 244. If the actuators 104a of the first separation do not have the latitude to move to the target position without exceeding the RR tolerance for the first separation, the coordinator 102 may proceed to step 214 for converging the second separation or the third separation to target positions, respectively.

If the actuators 104a of the first separation have the latitude to move to a target position within the RR tolerance of the first separation, the coordinator 102 may determine or may calculate the target position for the first separation as shown in step 246. In embodiments, the coordinator 102 may calculate the target position for the first separation, such as, for example, the magenta separation with the following expression:

$$\text{Magenta\_RRs\_Target}=\text{Magenta\_RRs\_Target}+\text{Delta\_RRs\_M}-\text{Delta\_RRs\_C} \quad (11)$$

The coordinator 102 may adjust the image density of the first separation to achieve the target position for relative error of the first separation via the actuators 104a of the first separation as shown in step 248. As a result, the relative error of the first separation may be converged to the target position. After converging the first separation to the target position for the first separation, the coordinator 102 may proceed to step 214 in the method 200 for converging the second separation or the third separation to target positions, respectively.

After completing the steps 202-248 of the method 200, the relative errors for each required single separation of color may be positioned in the target positions, respectively. Alternatively, each required single separation with actuators 104a-104c having latitude to adjust images densities to achieve the target positions may drive those relative errors to those target positions, respectively, by the coordinator 102. As a result, the relative errors for each required single separations of color may have converged and/or may have been adjusted to be errors in the same direction or to have offsets to the same side. With errors in the same direction or offsets to the same side, the toner particles from required single separations of color may produce the overlay colors having a minimized variation and the required single separations of color within the RR tolerance for each of the required single separations of color. Thus, the system 10, 100 and the method 200 may control consistent color quality for the overlay colors and the single separations of color without exceeding RR tolerance for each of the single separations of color.

The coordinator 102 may identify that the current relative errors of the required single separations of color provide the most consistent color control for the overlay colors and the single separations of color as shown in step 232. The coordinator 102 may indicate to the controller 16 that the current relative errors of the required single separations provide the most consistent color control for the overlay colors. The controller 16 may identify the current relative errors as printing parameters that provide the most consistent color control for the overlay colors. The controller 16 may process the print job by applying toner particles from the required single separations to the media 60 in accordance with the printing parameters. As a result, the systems 10, 100 may print or may form a color image on the media 60 with toner particles from the required single separations under the printing parameters associated with the single separations of color. The color image on the media 60 may have an overlay color quality that is predictable and consistent and actual density values for the single separations that are within tolerance ranges of the single separations.

EXAMPLE

Figure 6:
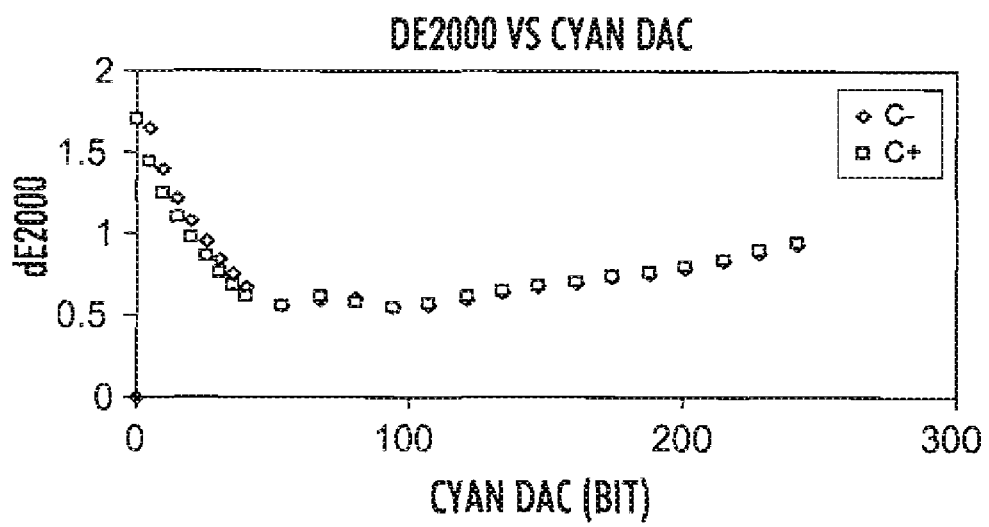
FIG. 6 illustrates a chart for dE2000 versus Cyan DAC in an embodiment of the present disclosure.
Figure 7:
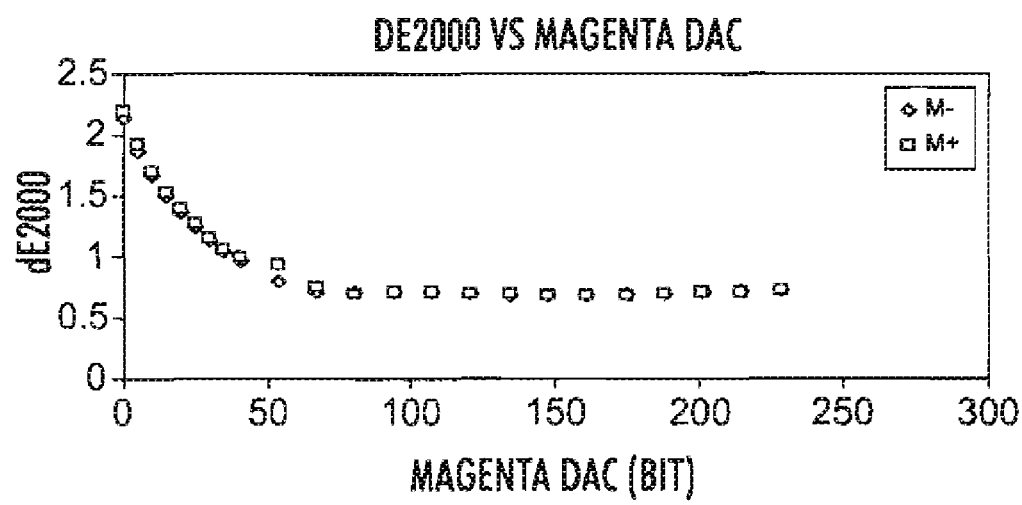
FIG. 7 illustrates a chart for dE2000 versus Magenta DAC in an embodiment of the present disclosure.
Figure 8:
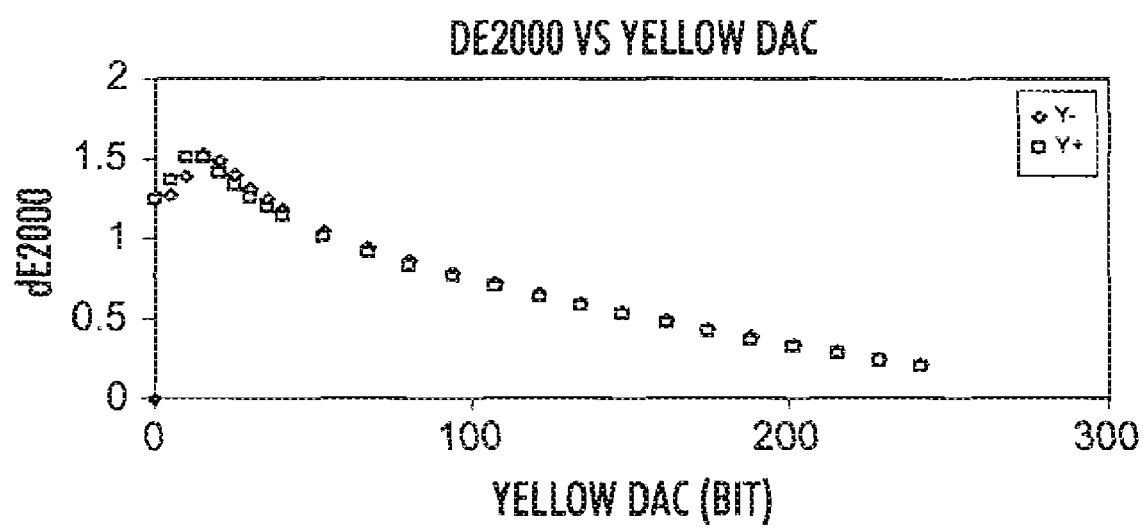
FIG. 8 illustrates a chart for dE2000 versus Yellow DAC in an embodiment of the present disclosure.

FIGS. 6-8 illustrate data collected with respect to the RR tolerance for each single separation of the required single separations of color, namely, a cyan separation, a yellow separation and a magenta separation. The data was collected from an iGen3 machine manufactured by Xerox having a level II process control to maintain each single separation of color within RR space in a range of, for example, +/−0.015. The data relating to the RR tolerance was emulated by, for example, the color digital bit input error of +/−4 bits in the 0-255 range in DAC space. This error was converted to a color error in dE2000 and is thus illustrated in FIGS. 6-8 from each of the critical separations.

In embodiments, the term "dE2000" may refer to a standard color error definition from ICE, the International Commission on Illumination or Commission Internationale de l'Eclairage. More specifically, FIG. 6 illustrates dE2000 versus Cyan DAC, FIG. 7 illustrates dE2000 versus Magenta DAC and FIG. 8 illustrates dE2000 versus Yellow DAC. As shown in FIGS. 6-8, the data indicates that a color variation for each of the three separations may be less than (see FIGS. 6 and 8) or may be slightly higher than (see FIG. 7) two (2) units in dE2000.

Figure 9:
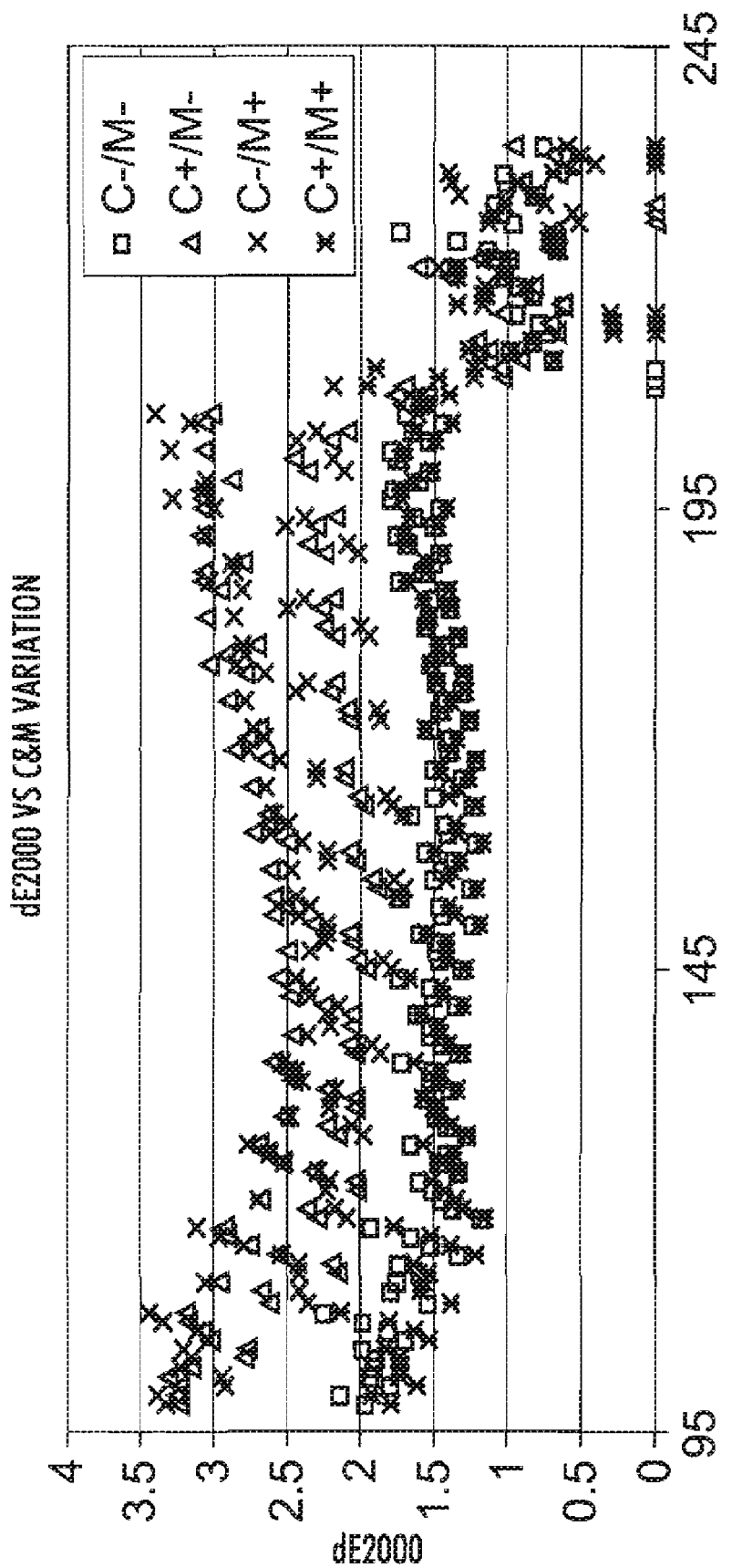
FIG. 9 illustrates a chart for a magnitude of a overlay color variation dependent on an error direction of each single separation of color in an embodiment of the present disclosure.

FIG. 9 illustrates that a magnitude of a overlay color variation depends on an error direction of each single separation of color. Additionally, FIG. 9 illustrates dE2000 versus variations in two single separations of color. More specifically, FIG. 9 illustrates that the overlay colors for two single separations of color, namely, cyan and magenta, may have a variation that is minimized or is smallest when both of the two single separations of color have an offset to the same side or an error in the same direction, such as, for example, in the positive direction or the negative direction. Further, the data in FIG. 9 illustrates that the variation with respect to cyan and magenta is substantially lower when cyan and magenta have errors in the same direction when compared to cyan and magenta having errors in different directions.

Figure 10:
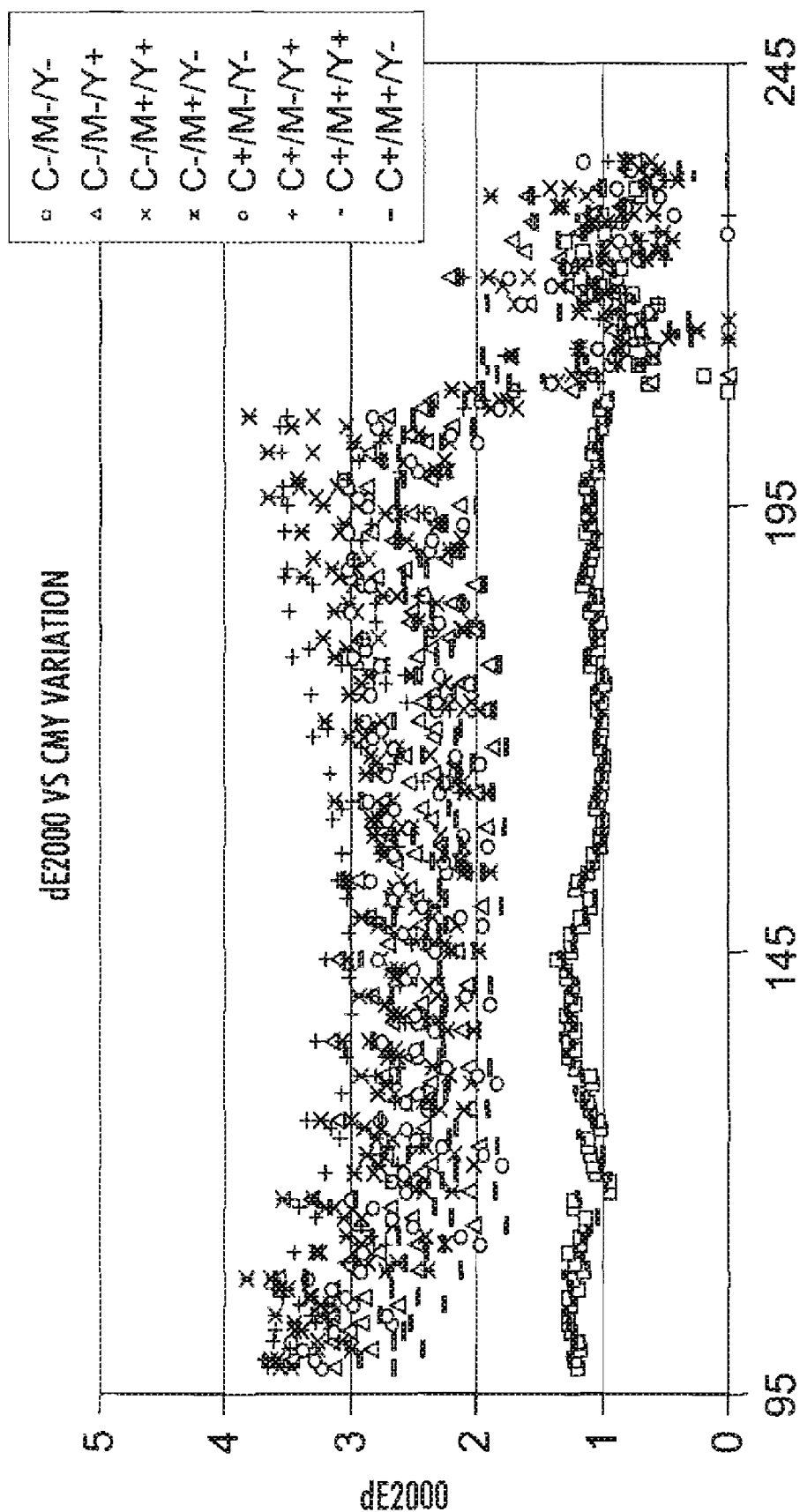
FIG. 10 illustrates a chart for dE2000 versus variations in three single separations of color in an embodiment of the present disclosure.

FIG. 10 illustrates dE2000 versus variations in three single separations of color. As shown in FIG. 10, if all three single separations of color, namely, cyan, magenta and yellow are controlled to have offsets to the same sides of or errors in the same directions, the variation of the overlay colors is minimized to provide consistent color quality for the overlay colors. In embodiments, the variations of the overlay colors of all with three single separations have offsets to the same side or errors in the same direction is between a range of about 20% and about 40% or more preferably between a range of about 25% and about 35%. As illustrated by the data in FIG. 10, the systems 10, 100 and the method 200 may determine which image densities of the single separations of color to drive for achieving a target position of the relative errors to obtain and to produce maximized overlay color stability without impacting the latitude of each single separation of color.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A system for controlling consistent color quality of overlay colors in a color printer or copier comprising:
   a first developer unit with first toner particles of a first color, wherein in forming a first test patch, the first developer unit transfers the first toner particles at a first target density, a controller subsequently determines a first actual density value of the first toner particles in the first test patch from an input of measurement of the first test patch,
   and determines a first error based on a difference between the first actual density value and the first target density, the first error having a positive or a negative value;
   a second developer unit with toner particles of a second color, wherein the second color is a different color than the first color, wherein in forming a second test patch, the second developer unit transfers the second toner particles at a second target density, and the controller subsequently determines a second actual density value of the second toner particles in the second test patch from an input of measurement of the second test patch, and determines a second error based on a difference between the second actual density value and the second target density, the second error having a positive or a negative value; and
   a coordinator, wherein the coordinator compares the first error to the second error, and wherein when the first error has a value opposite in sign to the value of the second error, the coordinator adjusts the density of the first toner particles to be applied by the first developer unit, the density of the second toner particles to be applied by the second developer unit, or both, so that the first error and the second error have a value with a same sign following the adjustment.

2. The system according to claim 1 further comprising:
   one or more actuators operatively connected to the first developer unit and the second developer unit, wherein the density of the toner particles to be applied by the developer units is adjustable by the one or more actuators.

3. The system according to claim 1 further comprising:
   a third developer unit with third toner particles of a third color, wherein the third color is a different color than the first color and the second color, wherein the overlay colors include toner particles of at least one of the first color, the second color and the third color.

4. The system according to claim 3, wherein in forming a third test patch, the third developer unit transfers the third toner particles at a third target density, and the controller subsequently determines a third actual density value of the third toner particles in the third test patch from an input of measurement of the third test patch, and determines a third error based on a difference between the third actual density value and the third target density, the third error having a positive or negative value, wherein the coordinator further evaluates the third error, and wherein the coordinator adjusts the density for one or more of the first developer unit, the second developer unit and the third developer unit when at least one of the first error, the second error and the third error have values different in sign from each other.

5. A xerographic marking device incorporating the system of claim 1.

6. A method for controlling consistent color quality of overlay colors and single separations of color in a color printer or copier comprising:
   creating a first test patch of first toner particles of a first of color at a first target density with a first developer unit, wherein a controller determines a first actual density of the first toner particles of the first test patch, the controller compares the first actual density toner to the first target density, and the controller determines a first error for the first color, wherein the first error has a first sign of positive or negative with respect to the first target density,
   creating a second test patch of second toner particles of a second color, wherein the second color is a different color than the first color, at a second target density with a second developer unit, wherein the controller determines a second actual density of the second toner particles of the second test patch, the controller compares the second actual density to the second target density and the controller determines a second error for the second color, wherein the second error has a second sign of positive or negative with respect to the second target density;
   comparing the first sign of the first error and the second sign of the second error; and
   converging the actual density of one of the first color or the second color to a target position when the first sign is a different sign than the second sign by adjusting the density of the first toner particles to be applied by the first developer unit, the second toner particles to be applied by the second developer unit, or both, so that following the converging, the first sign and the second sign are the same.

7. The method according to claim 6 further comprising:
determining that an actuator for the second color has latitude to change the actual density value of the second color to the target position.

8. The method according to claim 6 further comprising:
calculating a target position for the actual density of the second color, wherein the target position is located within a density tolerance range assigned to the second color.

9. The method according to claim 6 further comprising:
creating a third test patch of third toner particles of a third color at a third target density with a third developer unit, wherein the controller determines a third actual density of the third toner particles of the third test patch, the controller compares the third actual density to the third target density, and the controller determines a third error for the third color, wherein the third error has a third sign of positive or negative with respect to the third target density, wherein when the third sign is a different sign than the first sign of the first error or the third sign is a different sign than the second sign of the second error, a density of the third toner particles to be applied by the third developer unit is adjusted, so that the third error is adjusted to have a same sign as the first sign of the first error or is moved to have a same sign as the second sign of the second error.

10. The method according to claim 9 further comprising:
minimizing a variation of the overlay colors by having the third sign of the third error, the second sign of the second error and the first sign of the first error be the same sign.

11. The method according to claim 9 further comprising:
maintaining the first actual density of the first color, the second actual density of the second color and the third actual density of the third color within a predetermined range of densities assigned to the first color, the second color, and the third color.

12. The method according to claim 6 further comprising:
forming an image on a sheet of media, wherein the image is formed with toner particles from at least one of the first color and the second color.

13. A method for controlling consistent color quality of overlay colors and single separations of color in a color printer or copier comprising:
determining errors for each color to make up a full color image by evaluating a test patch for each color applied by a developer unit, and determining a sign of positive or negative for each error with respect to a mid-point density value of a predetermined density range for that color, wherein the errors are representative of density for that color; and
comparing the sign of each error, wherein when the comparison determines that the sign for the error for two or more of the colors are different, the method further comprises adjusting the sign of one or more of the errors by changing a density to be applied by the developer unit for the color associated with the error so that all of the errors have a same sign following adjustment.

14. The method according to claim 13 further comprising:
determining that an actuator for a color is capable of adjusting the density for that color by determining if the adjusted density value is within the predetermined density range of the test patches for that color.

15. The method according to claim 13 further comprising:
minimizing a variation of the overlay colors by converging the errors for each color of the overlay colors.

16. The method according to claim 13 further comprising:
maintaining the error for each color within a predetermined range of densities for each color.

17. The method according to claim 13:
wherein the adjusting of the density for a color is performed by an actuator operatively associated with the developer unit for that color, wherein the actuator adjusts the density for that color to a target position that is located within the density range for that color.

18. The method according to claim 13 further comprising:
forming an image on a sheet of media, wherein the image is formed by toner particles from at least one color.

* * * * *